(12) United States Patent
Darrow, Jr. et al.

(10) Patent No.: US 10,703,466 B2
(45) Date of Patent: Jul. 7, 2020

(54) PROPULSOR HUB WEIGHT ELEMENT AND BALANCING METHOD

(71) Applicant: Sikorsky Aircraft Corporation, Stratford, CT (US)

(72) Inventors: David A. Darrow, Jr., Stratford, CT (US); Ron William Waldo, North Richland Hills, TX (US); Christopher L. Winslow, Trumbull, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 156 days.

(21) Appl. No.: 15/568,658

(22) PCT Filed: May 17, 2016

(86) PCT No.: PCT/US2016/032870
§ 371 (c)(1),
(2) Date: Oct. 23, 2017

(87) PCT Pub. No.: WO2016/187196
PCT Pub. Date: Nov. 24, 2016

(65) Prior Publication Data
US 2018/0141646 A1   May 24, 2018

Related U.S. Application Data

(60) Provisional application No. 62/163,848, filed on May 19, 2015.

(51) Int. Cl.
*B64C 27/00* (2006.01)
*B64C 27/48* (2006.01)
(Continued)

(52) U.S. Cl.
CPC ............ *B64C 27/008* (2013.01); *B64C 11/06* (2013.01); *B64C 27/10* (2013.01); *B64C 27/32* (2013.01);
(Continued)

(58) Field of Classification Search
CPC ............ B64C 27/008; B64C 2027/003; B64C 2027/005
See application file for complete search history.

(56) References Cited

U.S. PATENT DOCUMENTS

| 1,608,754 A | 11/1926 | McCauley |
| 1,869,182 A | 7/1932 | Blanchard |

(Continued)

FOREIGN PATENT DOCUMENTS

GB           630195 A    10/1949

OTHER PUBLICATIONS

International Search Report and Written Opinion; International Application No. PCT/US2016/32870; International Filing Date: May 17, 2016; dated Aug. 23, 2016; 15 Pages.

*Primary Examiner* — Christopher Verdier
*Assistant Examiner* — Juan G Flores
(74) *Attorney, Agent, or Firm* — Cantor Colburn LLP

(57) ABSTRACT

A propulsor hub is provided and includes a casing including an inner annular part and blade-connection parts extending outwardly from the inner annular part, a liner having inner and outer opposed radial ends, the liner being disposed about a corresponding one of the blade-connection parts with the inner radial end thereof at a distance from the inner annular part and a weighted element securely disposed about the corresponding one of the blade-connection parts to abut the outer radial end of the liner.

13 Claims, 5 Drawing Sheets

(51) Int. Cl.
*B64C 27/82* (2006.01)
*B64C 27/32* (2006.01)
*B64C 11/06* (2006.01)
*B64C 27/10* (2006.01)

(52) U.S. Cl.
CPC ............ *B64C 27/48* (2013.01); *B64C 27/82* (2013.01); *B64C 2027/8236* (2013.01)

(56) References Cited

U.S. PATENT DOCUMENTS

| | | | |
|---|---|---|---|
| 2,530,520 | A | 11/1950 | Hackethal et al. |
| 2,715,446 | A | 8/1955 | Felt |
| 4,255,084 | A | 3/1981 | Mouille et al. |
| 4,281,966 | A | 8/1981 | Duret et al. |
| 4,306,836 | A * | 12/1981 | Mayerjak ................ B64C 27/32 416/134 A |
| 5,096,352 | A * | 3/1992 | Lemelson ............... B24D 18/00 411/424 |
| 5,263,821 | A * | 11/1993 | Noehren ................. B64C 27/33 415/115 |
| 8,267,661 | B2 | 9/2012 | Lamborn et al. |
| 2014/0322009 | A1 | 10/2014 | Perkinson et al. |

* cited by examiner

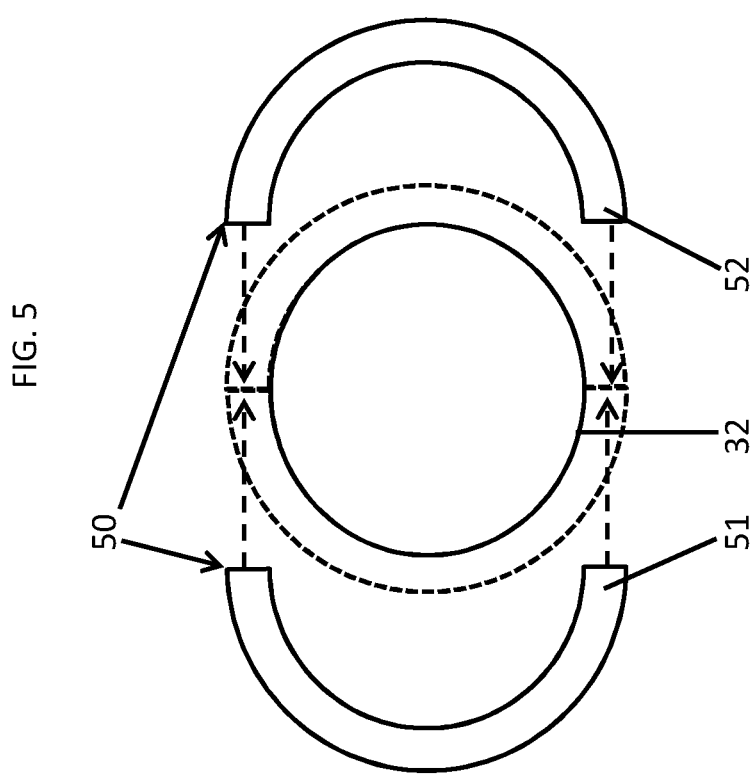

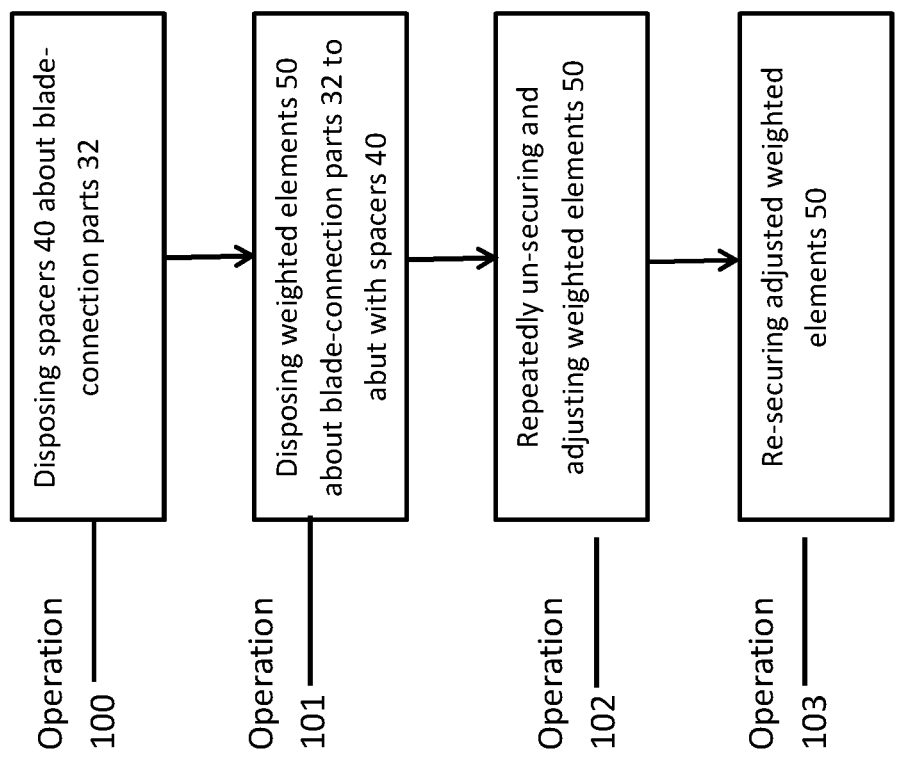

PROPULSOR HUB WEIGHT ELEMENT AND BALANCING METHOD

CROSS REFERENCE TO RELATED APPLICATIONS

This application is a National Stage application of PCT/US2016/032870, filed May 17, 2016, which claims the benefit of U.S. Provisional Application No. 62/163,848, filed May 19, 2015, both of which are incorporated by reference in their entirety herein.

STATEMENT OF FEDERAL SUPPORT

This invention was made with government support under army contract No.: W911W6-13-2-0003 awarded by the Joint Multi Role Technology Development Program. The government has certain rights in the invention.

BACKGROUND

The subject matter disclosed herein relates to a propulsor hub and, more particularly, to a structurally efficient integral weight balance approach for a propulsor hub.

A compound helicopter may include an airframe, a main rotor assembly and a propulsor assembly. The main rotor assembly is typically operably disposed at an upper portion of the airframe and may include coaxial, counter-rotating main rotors. The propulsor assembly could then be operably disposed at the tail portion of the airframe.

In order to operate efficiently and predictably, the main rotor assembly for a non-coaxial helicopter is weighed to be balanced evenly about its hub. Typically, such weight balance is achieved by adding weighed elements to the central portion of the hub itself. However, since the weighed elements are at the central portion of the hub, the amount of added weight can be significant and thus results in a relatively heavy rotor assembly.

BRIEF DESCRIPTION

According to one aspect, a propulsor hub is provided and includes a casing including an inner annular part and blade-connection parts extending outwardly from the inner annular part, a liner having inner and outer opposed radial ends, the liner being disposed about a corresponding one of the blade-connection parts with the inner radial end thereof at a distance from the inner annular part and a weighted element securely disposed about the corresponding one of the blade-connection parts to abut the outer radial end of the liner.

In accordance with additional or alternative embodiments, the blade-connection parts are provided as eight blade-connection parts uniformly arrayed about the inner annular part.

In accordance with additional or alternative embodiments, the liner is provided as a plurality of liners respectively disposed about each of the blade-connection parts.

In accordance with additional or alternative embodiments, the multiple liners are provided on each of the blade-connection parts at a distance from each other.

In accordance with additional or alternative embodiments, the weighted element abuts the outer radial end of the outermost liner.

In accordance with additional or alternative embodiments, the multiple weighted elements are respectively securely disposed about each of the blade-connection parts in a weight balanced arrangement.

In accordance with additional or alternative embodiments, the liner includes a rigid flange at the inner radial end and an grooved flange at the outer radial end.

In accordance with additional or alternative embodiments, the weighted element includes tungsten.

In accordance with additional or alternative embodiments, the weighted element includes first and second weighted element halves that are tightly fittable together about the corresponding one of the blade-connection parts.

In accordance with additional or alternative embodiments, the propulsor hub further includes a nut configured to be tightened onto the corresponding one of the blade-connection parts to secure the weighted element in an abutment condition with the outer radial end of the liner.

According to another aspect, a propulsor hub balancing method is provided for use with a propulsor hub including a casing, the casing including an inner annular part and a blade-connection part extending outwardly from the inner annular part. The method includes disposing a weighted element about the blade-connection parts to abut an outer radial end of liner in a weight balanced arrangement, and securing the weighted element to press against the outer radial end of the liner using a securing element.

In accordance with additional or alternative embodiments, the method further includes testing the weight balanced arrangement, if the testing reveals that the weight balanced arrangement is out of balance, removing the weighted element and/or adding another weighted element to refine the weight balanced arrangement to arrive at a final weight balanced arrangement and resecuring the weighted and/or another weighted element using the securing element.

In accordance with additional or alternative embodiments, the weighted elements each include first and second weighted element halves that are tightly fittable together about the blade-connection parts.

In accordance with additional or alternative embodiments, the method further includes tightening nuts onto the blade-connection parts to secure the weighted elements in abutment conditions with the respective outer radial ends of the liners.

In accordance with additional or alternative embodiments, the adjusting includes replacing the weighted elements with lighter or heavier weighted elements.

These and other advantages and features will become more apparent from the following description taken in conjunction with the drawings.

BRIEF DESCRIPTION OF THE DRAWINGS

The subject matter, which is regarded as the embodiments, is particularly pointed out and distinctly claimed in the claims at the conclusion of the specification. The foregoing and other features, and advantages are apparent from the following detailed description taken in conjunction with the accompanying drawings in which:

FIG. 5 is an axial view of weighted element halves in accordance with embodiments; and FIG. 6 is a flow diagram illustrating a propulsor hub balancing method in accordance with embodiments.

The detailed description explains embodiments, together with advantages and features, by way of example with reference to the drawings.

DETAILED DESCRIPTION

As will be described below, a propulsor hub is provided and weight balanced to account for variation in material thickness as well as variations in positions of assembled components. This weight balancing is achieved using an arrangement and structural attachment balancing method that maximizes the balance effect with a minimal amount of weight being added to the propulsor. Embodiments include a series of ring-shaped tungsten balance weights attached to the propulsor hub at a relatively large distance from a center of rotation of the propulsor hub. The weight package is centered about a metal spindle at its outermost extremity. The balance weights are compressed against liner on this spindle by a thin profile clamping nut. Variation of balance effect is controlled by the combination of high density ring weights and low density ring liners clamped up by the thin profile nut.

Figure 1:
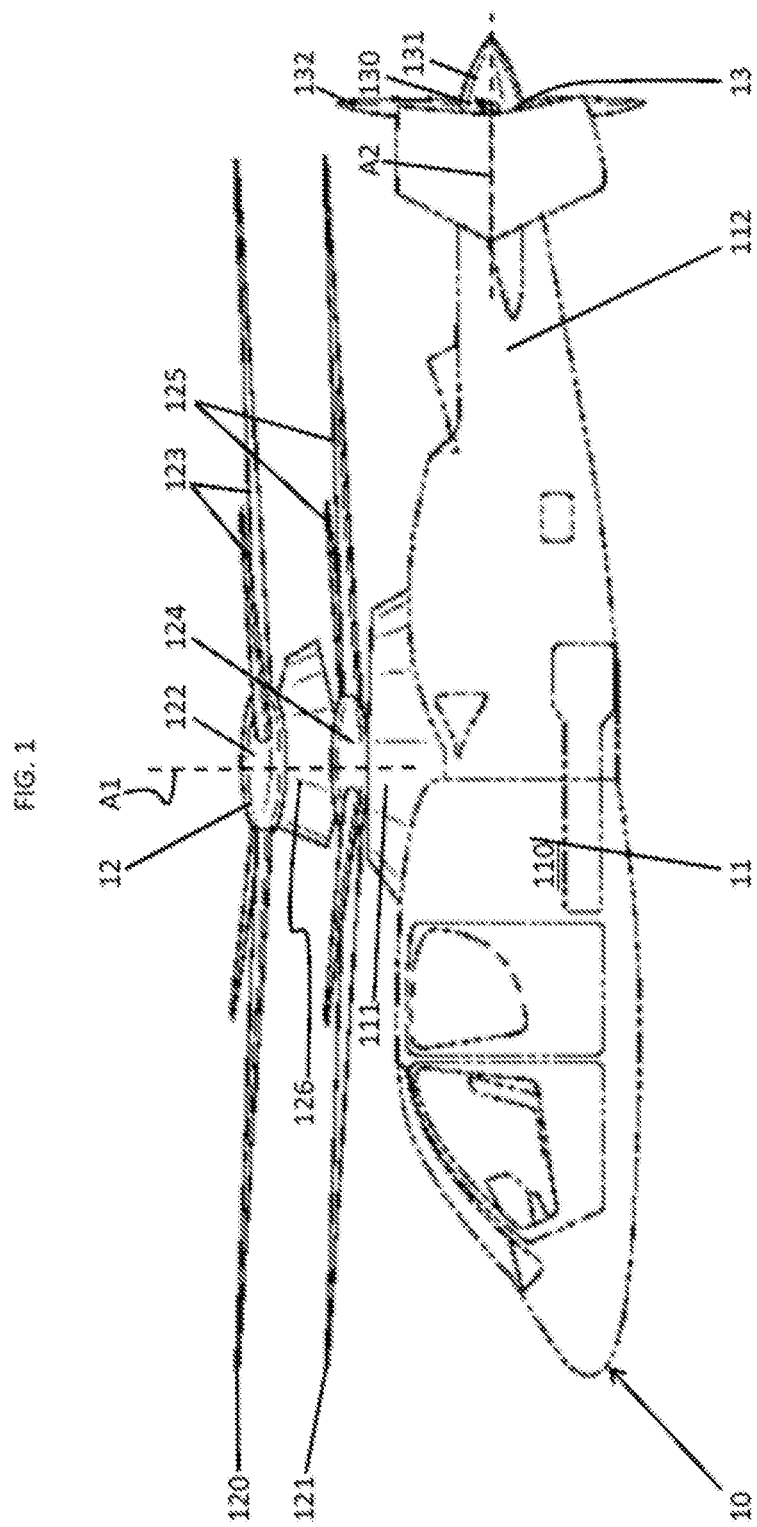
FIG. 1 is a perspective view of an aircraft in accordance with embodiments.

With reference to FIG. 1, an aircraft 10 is provided and may be configured in certain embodiments as a compound helicopter with coaxial, counter-rotating main rotors and a propulsor. The aircraft 10 includes an airframe 11, a main rotor assembly 12 and a propulsor assembly 13. The airframe 11 has a main portion 110, an upper portion 111 and a tail portion 112. The main portion 110 is configured to accommodate a pilot and, in some cases, one or more crewmen and/or passengers. The upper portion 111 is disposed above the main portion 110 and the tail portion 112 extends in the aft direction from the main portion 110. The main rotor assembly 12 is operably disposed at the upper portion 111 of the airframe 11. The propulsor assembly 13 is operably disposed at the tail portion 112 of the airframe 11.

The main rotor assembly 12 includes an upper rotor 120 and a lower rotor 121 that are each drivably rotatable in opposite rotational directions about a common rotational axis A1 defined through the airframe 11 to generate lift and thrust for the aircraft 10. The upper rotor 120 includes an upper hub 122 and upper rotor blades 123 extending outwardly from the upper hub 122. Similarly, the lower rotor 121 includes a lower hub 124 and lower rotor blades 125 extending outwardly from the lower hub 124. The main rotor assembly 12 may further include an aerodynamic fairing 126 interposed between the upper and lower hubs 122 and 124. Each of the upper rotor blades 123 and each of the lower rotor blades 125 can be pivoted about a respective longitudinal axis thereof by way of collective and cyclic commands to execute flight control (e.g., lift, pitch, roll and yaw control) of the aircraft 10.

The propulsor assembly 13 includes a propulsor 130 that is drivably rotatable about a propulsor rotational axis A2 to generate additional thrust for the aircraft 10. While the propulsor rotational axis A2 is shown in parallel with a longitudinal axis of the tail portion 112, it is understood that the axis A2 can be non-parallel with the longitudinal axis of the tail portion 112 in other aspects. The propulsor 130 includes a hub 131 and rotor blades 132 extending outwardly from the hub 131. Each of the rotor blades 132 can be pivoted about a respective longitudinal axis thereof by way of collective and cyclic commands to execute additional flight control (e.g., thrust and yaw control) of the aircraft 10. For example, the rotor blades 132 can be controlled collectively in order to increase or decrease aircraft 10 thrust and at low speed flight regimes, in particular, the rotor blades 132 can be controlled cyclically to provide for increased or decreased yaw control of the aircraft 10.

Although not shown, the aircraft 10 further includes an engine, a transmission system and a flight computer. The engine generates power by which the main rotor assembly 12 and the propulsor assembly 13 are operated and the transmission system transmits the generated power from the engine to the main rotor assembly 12 and the propulsor assembly 13. The flight computer controls various operations of the engine, the transmission system and the collective and cyclic controls of the main rotor assembly 12 and the propulsor assembly 13 in accordance with pilot inputted commands, control algorithms and current flight conditions.

With reference to FIGS. 2-5, any of the upper hub 122 and the lower hub 124 of the main rotor assembly 12 and the hub 131 of the propulsor assembly 13 may include the features described below and be assembled in accordance with the description provided along with FIG. 6. For purposes of clarity and brevity it will be assumed that the descriptions generally refer to the features and assembly method of the hub 131 of the propulsor assembly 13 (hereinafter referred to as "propulsor hub 20") but it will be understood that this is merely exemplary and that the descriptions can actually apply to any similar structures of the aircraft 10 or any other propulsor aircraft.

As shown in FIGS. 2-5, the propulsor hub 20 includes a casing 30, a liner 40 and a weighted element 50. The casing 30 includes an inner annular part 31 and blade-connection parts 32. The inner annular part 31 extends longitudinally along a drive shaft element 33 and may be cylindrically-shaped with an annular body 310. The blade-connection parts 32 may be provided in a group of eight blade-connection parts 32 that each extend radially outwardly from the inner annular part 31 at a uniform distance and angle from one another. Each blade-connection part 32 may be oriented in parallel with the radial dimension of the inner annular part 31 and may include a cylindrically-shaped or slightly tapered annular body 320. Both the inner annular part 31 and the blade-connection parts 32 may also be generally hollow such that the inner annular part 31 can accommodate drive shaft and hub element components and such that the blade-connection parts 32 can accommodate inboard blade elements of the rotor blades 132 and hub connector components of the hub 131.

In accordance with embodiments, both the inner annular part 31 and the blade-connection parts 32 may be welded together or formed integrally with respective exterior surfaces 311 and 321. In such cases, the exterior surface 311 of the inner annular part 31 angularly or smoothly (i.e., with rounded corners or radial interfaces 33) connects with the exterior surface 321 of the blade-connection parts 32.

In any case, the liner 40 may be plural in number and at least one of the plural liners 40 may be disposed on corresponding ones of the blade-connection parts 32. In detail, each liner 40 has a liner body 401 with an inner radial end 402 and an outer radial end 403 that opposes the inner radial end 402 (see FIGS. 3 and 4). The liner bodies 401 have cylindrically-shaped or slightly tapered interior surfaces such that they can be disposed about each of the blade-connection parts 32 with the respective inner radial ends 402 thereof proximate to but at a distance from the inner annular part 31 and the respective outer ends 403 thereof remote from the inner annular part 31.

Figure 4:
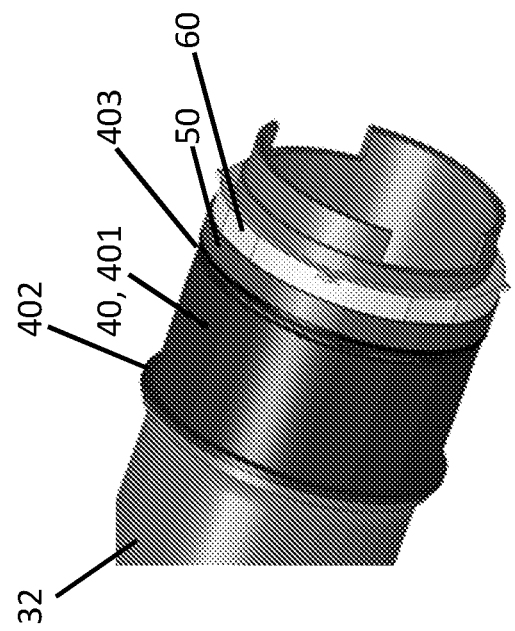
FIG. 4 is a cross-sectional view of the portion of the propulsor hub of FIG. 3.

In accordance with further embodiments, the liner 40 may include a rigid flange 404 and a grooved flange 405 (see FIG. 4). The rigid flange 404 is at the inner radial end 402 and extends radially outwardly relative to the radial dimension of the blade-connection part 32 to be abuttable with a complementary shoulder portion 322 of the blade-connection part 32. The grooved flange 405 is at the outer radial end 403 and may be provided in a hook-type configuration that extends radially inwardly, axially and then radially outwardly relative to the radial dimension of the blade-connection part 32.

As described below, the weighted element 50 may be formed of tungsten or another similar metallic material or metallic alloy material or of a ceramic material. The weighted element 50 may be a single weight, or plural weights with each of the plural weighted elements 50 securely disposable about the blade-connection parts 32. As such, in some cases, the weighted elements 50 abut the grooved flanges 405 at the respective outer radial ends 403 of the liners 40 in a weight-balanced arrangement or formation. While shown with each blade-connection parts 32 having a weighted element 50, it is understood that not all blade-connection parts 32 need to have a weighted element 50 in all aspects of the invention.

Figure 2:
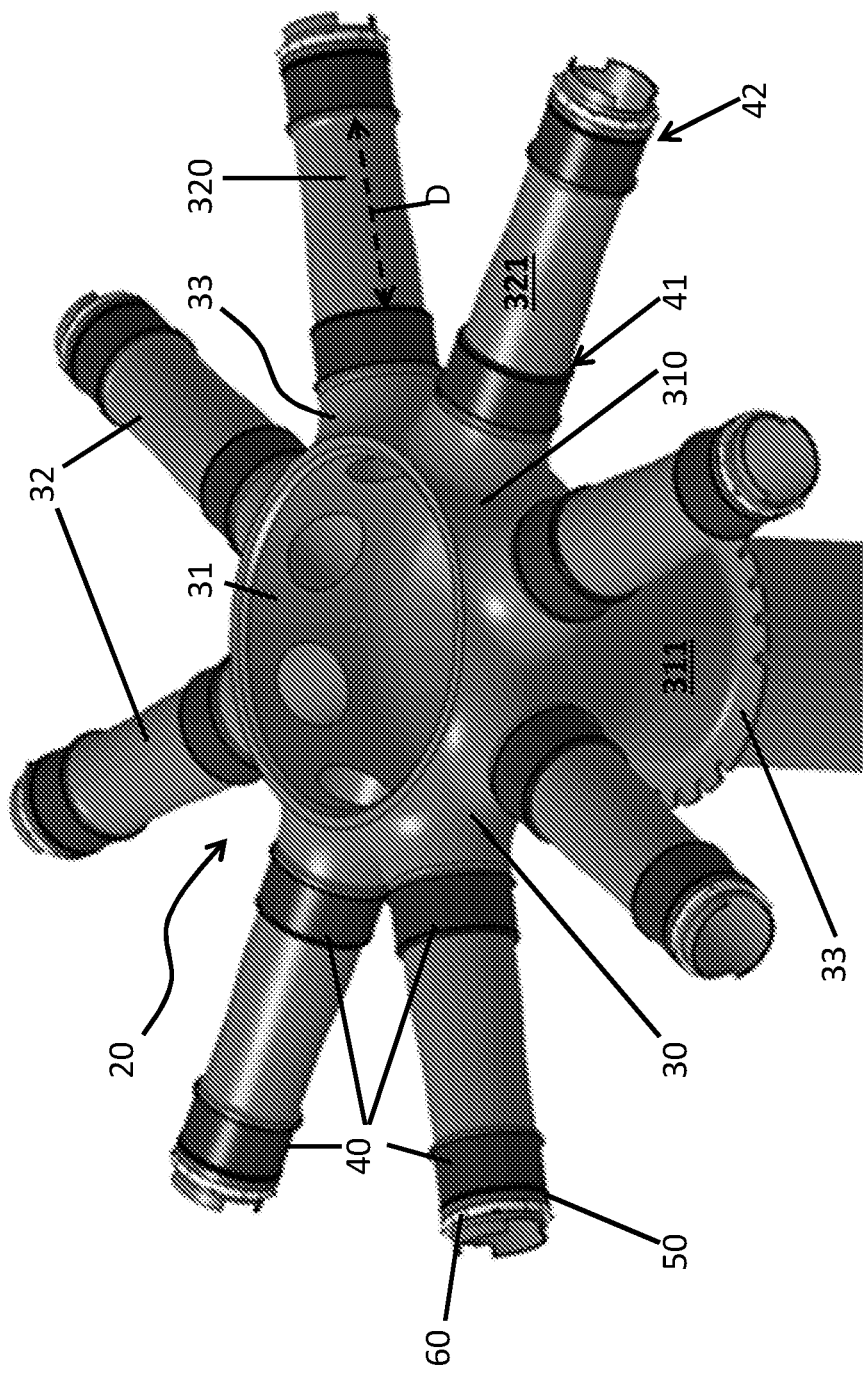
FIG. 2 is a perspective view of a propulsor hub in accordance with embodiments.

As shown in the embodiment of FIG. 2, at least two or more liners 40 may be disposed about each of the blade-connection parts 32 in inner and outer circumferential arrays 41 and 42. In the embodiment of FIG. 2, two liners 40 are provided at a distance from one another at each of the blade-connection parts 32. Thus, at each blade-connection part 32, the outer radial end 403 of the innermost one of the two liners 40 faces the inner radial end 402 of the outermost one of the two liners 40 at a distance D and the outer radial end 403 of the outermost one of the two liners 40 is remote from the inner annular part 31.

The weighted element 50 may be formed as a solid annular body with a generally rectangular cross-sectional shape. The weighted element 50, like the liners 40, may be provided as plural weighted elements 50 with each being slid onto the blade-connection parts 32 along an inward radial direction relative to the inner annular part 31 until abutting with the outer radial end 403 of the corresponding liner 40. In this position, the weighted element 50 provides the propulsor hub 20 with mass at a distance from the inner annular part 31. Such mass at that distant location allows for an operational (i.e., rotating) weight balanced propulsor hub 20 as the distant mass is subject to centrifugal loading and is effectively increased while permitting a general decrease in a rest mass of the propulsor hub 20.

Figure 3:
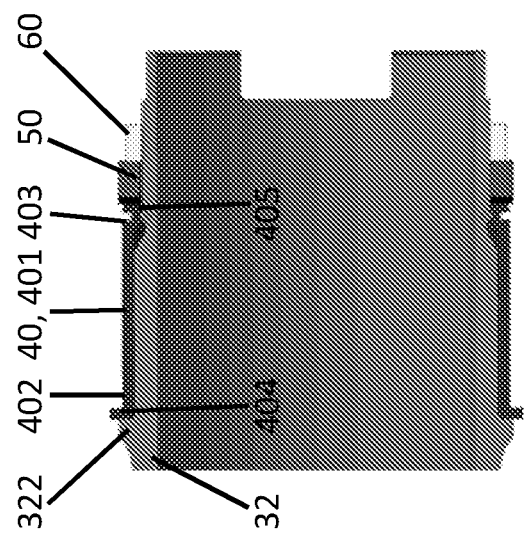
FIG. 3 is an enlarged perspective view of a portion of the propulsor hub of FIG. 2.

As shown in FIG. 3, the weighted element 50 can be a single circular piece. In an alternative embodiment shown in FIG. 5, the weighted element 50 may be a circle which is split to form first and second weighted element halves 51 and 52 (or additional numbers of circular segments, e.g., first-third weighted element thirds, first-fourth weighted element quarters, etc.). In such cases, the split between first and second weighted element halves 51 and 52 can be opened such that the weighted element 50 can be fit onto one of the blade-connection parts 32 without removing the blade 132, and once on the part 32, the halves 51 and 52 can be rejoined at the split. The halves 51, 52 can be achieved using a single piece meeting at the split, such as large split washer, or by the halves 51, 52 being combined using fittings which are tightly fittable together above the part 32. Such fittings may be achieved by way of, for example, a combination of temporary fittings or more permanent fittings. The temporary fittings of the first and second weighted element halves 51 and 52 may include screw-fittings, mechanical fittings and/or interference fittings that allow for the weighted elements 50 to be removed from the blade-connection parts 32. By contrast, the more permanent fittings may include welded fittings or the like that do not permit weighted element 50 removal without the blade assembly disassembly processes being undertaken.

The propulsor hub 20 may further include fastening elements, such as a plurality of nuts 60, to secure the weighted elements 50 in place on the blade-connection parts 32. The nuts 60 may be configured to be tightened onto the corresponding ones of the blade-connection parts 32 to thereby secure the weighted elements 50 in the abutment condition with the respective outer radial ends 403 of the liners 40. In addition, the nuts 60 can be loosened from the tightened position to thereby allow the weighted elements 50 to be manipulated, added to, removed or replaced, as will be described below, in order to obtain an overall weight balanced condition for the propulsor hub 20.

With reference to FIG. 6, a propulsor hub balancing method for use with the propulsor hub 20 described above is provided. The method includes disposing the liner 40 about the blade-connection part 32 with the respective inner radial ends 402 thereof at a distance from the inner annular part 31 (operation 100) and securely disposing the weighted element 50 about the blade-connection parts 32 to abut the respective outer radial end 403 of the liner 40 in an initial weight balanced arrangement (operation 101). Here, the secured disposition of the weighted elements 50 may involve coupling the first and second halves 51 and 52 of the weighted elements 50 about the blade-connection parts 32 and securing the weighted elements 50 in position using the nut 60, or by sliding the weighted element 50 onto the part 32. The initial weight balanced arrangement may include a same number of liners 40 and weighted elements 50 being disposed about each of the blade-connection parts 32 but would be testable in a propulsor operation once the assembly is completed to determine if adjustments should be made.

In an event that testing of the initial weight balanced arrangement reveals that refinements are needed, the method further includes repeatedly un-securing and adjusting one or more of the weighted elements 50 to thus refine the initial weight balanced arrangement and to thereby arrive at a final and substantially accurate weight balanced arrangement (operation 102) and then re-securing the adjusted one or more weighted elements 50 in the final and substantially accurate weight balanced arrangement (operation 103). In accordance with embodiments, the adjusting of the weighted elements 50 may include, for example, replacing some of the weighted elements 50 with those of with lighter or heavier weighted elements 50 of similar size, replacing some of the weighted elements 50 with those of similar weight but larger or smaller size, adding and/or subtracting weighted elements 50 to each of the blade-connection parts 32.

It is understood that operation 102 need not be performed in all aspects, such as where the initial weight balanced arrangement does not need refinement after operation 101. Additionally, it is understood that in some aspects, the blades 132 are not attached during operations 100 through 103 and are attached to part 32 after operation 103 has been completed, and in other embodiments, the blades 132 remain attached to part 32 during one or all of the operations 100 through 103.

While the embodiments have been described, it should be readily understood that the aspects are not limited to such disclosures. Rather, the embodiments can be modified to incorporate any number of variations, alterations, substitutions or equivalent arrangements not heretofore described, but which are commensurate with the spirit and scope of the description. By way of example, aspects of the invention can be used in a main rotor hub, a propeller for a fixed wing aircraft, wind turbines, or other hubs where balancing is designed. Additionally, while various embodiments have been described, it is to be understood that aspects may include only some of the described embodiments. Accordingly, the description is not to be seen as so limited.

What is claimed is:

1. A propulsor hub, comprising:
   a casing including an inner annular part and a plurality of annular blade-connection parts extending radially outwardly from the inner annular part;
   a plurality of liners provided on each of the plurality of annular blade-connection parts at a distance from each other, each of the plurality of liners having inner and outer opposed radial ends, the inner radial end being spaced from the inner annular part; and
   a weighted element securely disposed about a corresponding one of the blade-connection parts to abut the outer radial end of the corresponding one of the plurality of liners.

2. The propulsor hub according to claim 1, wherein the plurality of annular blade-connection parts are provided as eight annular blade-connection parts uniformly arrayed about the inner annular part.

3. The propulsor hub according to claim 1, wherein the weighted element abuts the outer radial end of the outermost liner.

4. The propulsor hub according to claim 1, wherein multiple weighted elements are respectively securely disposed about each of the plurality of annular blade-connection parts in a weight balanced arrangement.

5. The propulsor hub according to claim 1, wherein each of the plurality of liners comprises:
   a rigid flange at the inner radial end; and
   a grooved flange at the outer radial end.

6. The propulsor hub according to claim 1, wherein the weighted element comprises tungsten.

7. The propulsor hub according to claim 1, wherein the weighted element comprises first and second weighted element halves that are tightly fittable together about the corresponding one of the plurality of annular blade-connection parts.

8. The propulsor hub according to claim 1, further comprising a nut configured to be tightened onto the corresponding one of the plurality of annular blade-connection parts to secure the weighted element in an abutment condition with the outer radial end of the corresponding one of the plurality of liners.

9. A propulsor hub balancing method for use with a propulsor hub including a casing, the casing including an inner annular part and a plurality of annular blade-connection parts extending radially outwardly from the inner annular part, the method comprising:
   disposing a weighted element about one or more of the plurality of annular blade-connection parts to abut an outer radial end of a liner in a weight balanced arrangement; and securing the weighted element to press against the outer radial end of the liner using a securing element.

10. The method according to claim 9, further comprising:
    testing the weight balanced arrangement;
    if the testing reveals that the weight balanced arrangement is out of balance, removing the weighted element and/or adding another weighted element to refine the weight balanced arrangement to arrive at a final weight balanced arrangement; and
    resecuring the weighted and/or another weighted element using the securing element.

11. The method according to claim 9, wherein the weighted element comprises first and second weighted element halves that are tightly fittable together about the one or more of the plurality of annular blade-connection parts.

12. The method according to claim 9, further comprising tightening nuts onto the one or more of the plurality of annular blade-connection parts to secure the weighted element in abutment conditions with the respective outer radial ends of the liners.

13. The method according to claim 9, further comprising:
    replacing the weighted element with lighter or heavier weighted elements to create a final weight balanced arrangement.

* * * * *